US011943040B2

(12) United States Patent
Boyali et al.

(10) Patent No.: US 11,943,040 B2
(45) Date of Patent: Mar. 26, 2024

(54) SYSTEM AND METHOD FOR DRONERAN CONTROLLER

(71) Applicant: NETSIA, INC., Santa Clara, CA (US)

(72) Inventors: Koksal Boyali, Istanbul (TR); Can Altay, Istanbul (TR); Erhan Lokman, Istanbul (TR); Seyhan Civanlar, Istanbul (TR)

(73) Assignee: NETSIA, INC., Santa Clara, CA (US)

( * ) Notice: Subject to any disclaimer, the term of this patent is extended or adjusted under 35 U.S.C. 154(b) by 352 days.

(21) Appl. No.: 17/337,179

(22) Filed: Jun. 2, 2021

(65) Prior Publication Data

US 2021/0384962 A1    Dec. 9, 2021

Related U.S. Application Data

(60) Provisional application No. 63/034,185, filed on Jun. 3, 2020.

(51) Int. Cl.
*H04B 7/185* (2006.01)
*B64C 39/02* (2023.01)
(Continued)

(52) U.S. Cl.
CPC ....... *H04B 7/18504* (2013.01); *B64C 39/024* (2013.01); *G08G 5/0008* (2013.01);
(Continued)

(58) Field of Classification Search
CPC ............. H04B 7/18504; G08G 5/0008; G08G 5/0013; H04W 84/18
(Continued)

(56) References Cited

U.S. PATENT DOCUMENTS 8,005,109 B2 *   8/2011   Wu ................. H04W 16/02
                                                       370/328
9,094,285 B2     7/2015   Gorkemli et al.
(Continued)

OTHER PUBLICATIONS

L. Zhang and N. Ansari, "Approximate Algorithms for 3-D Placement of IBFD Enabled Drone-Mounted Base Stations," in IEEE Transactions on Vehicular Technology, vol. 68, No. 8, pp. 7715-7722, Aug. 2019, doi: 10.1109/TVT.2019.2923143. (Year: 2019).*
(Continued)

*Primary Examiner* — Isaac G Smith
(74) *Attorney, Agent, or Firm* — IP AUTHORITY, LLC; Ramraj Soundararajan (57) ABSTRACT

Drone base stations (DBSs) create a radio access network (DRAN) that provides a quick on-demand coverage in areas either for lost coverage due to disasters (providing an emergency communications network (ECN)) or for specific military, governmental and IoT application needs. DRAN Control Functions may be modeled as Virtualized Network Functions (VNFs) to operate and control a flying DRAN that comprises a plurality of DBSs, providing near real-time configuration control functions. These unique functions apply to the combined drone and base station sub-components of each DBS. Unique configuration control actions are determining the number of drones, optimal 3D drone positioning, and the inter-drone graph topology by maximizing served cellular user clusters, while factoring in user slices, remaining drone flight times and RF interference. These functions can reside within a DRAN Controller for network-wide configuration control actions that precipitate across multiple DBSs, and within each DBS for node-specific configuration control actions.

20 Claims, 8 Drawing Sheets

(51) Int. Cl.
  *G08G 5/00* (2006.01)
  *H04W 84/18* (2009.01)
  *B64U 101/20* (2023.01)

(52) U.S. Cl.
  CPC .......... *G08G 5/0013* (2013.01); *H04W 84/18* (2013.01); *B64U 2101/20* (2023.01)

(58) Field of Classification Search
  USPC .......................................................... 701/3
  See application file for complete search history.

(56) References Cited

U.S. PATENT DOCUMENTS

| | | |
|---|---|---|
| 9,680,958 B2 | 6/2017 | Sunay |
| 9,713,077 B2 | 7/2017 | Kozat et al. |
| 9,942,819 B2 | 4/2018 | Sunay et al. |
| 9,949,188 B2 | 4/2018 | Sunay et al. |
| 9,973,993 B2 | 5/2018 | Ercan et al. |
| 10,003,909 B2 | 6/2018 | Altay et al. |
| 10,084,756 B2 | 9/2018 | Tatlicioglu et al. |
| 10,085,190 B2 | 9/2018 | Sunay et al. |
| 10,172,009 B1 | 1/2019 | Altay et al. |
| 10,172,139 B2 | 1/2019 | Soysal et al. |
| 10,251,104 B2 | 4/2019 | Sunay et al. |
| 10,484,285 B2 | 11/2019 | Ulas et al. |
| 10,536,379 B2 | 1/2020 | Atli et al. |
| 10,574,595 B2 | 2/2020 | Lokman et al. |
| 10,623,268 B2 | 4/2020 | Altay et al. |
| 10,798,638 B2 | 10/2020 | Altay et al. |
| 10,997,653 B2 | 5/2021 | Oktay et al. |
| 11,071,166 B2 | 7/2021 | Akman et al. |
| 11,336,538 B2 | 5/2022 | Akman et al. |
| 11,568,477 B2 | 1/2023 | Oktay et al. |
| 11,575,439 B1 | 2/2023 | Yigit et al. |
| 11,576,020 B1 | 2/2023 | Akman et al. |
| 11,602,010 B2 | 3/2023 | Akman et al. |
| 11,647,452 B2 | 5/2023 | Altay et al. |
| 2017/0208512 A1* | 7/2017 | Aydin .................... B64C 39/024 |
| 2018/0020081 A1* | 1/2018 | Teague .................. B64C 39/024 |
| 2020/0107360 A1* | 4/2020 | Xue ................. H04W 74/0808 |
| 2020/0220612 A1* | 7/2020 | Thomas ............... H04B 17/345 |

OTHER PUBLICATIONS

"O-RAN Use Cases and Deployment Scenarios," O-RAN Alliance, White Paper, Feb. 2020, pp. 1-21.

* cited by examiner

SYSTEM AND METHOD FOR DRONERAN CONTROLLER

RELATED APPLICATION

This application claims the benefit of provisional application 63/034,185 filed Jun. 3, 2020.

BACKGROUND OF THE INVENTION

Field of Invention

Aspects of the present invention relate to wireless communications technology and specifically to 5G and NFV for the control and management system of Unmanned Aerial Vehicle (UAV) mounted base stations (UAV-BSs), or flying base stations, forming a 3D mesh or relay Radio Access Network (RAN).

Discussion of Related Art

Any discussion of the prior art throughout the specification should in no way be considered as an admission that such prior art is widely known or forms part of common general knowledge in the field.

Using the drone base station (DBS) to alleviate the network coverage supply demand mismatch is an attractive issue. Found in DBS-assisted cellular mobile networks, the deployment of DBSs to cope with the dynamic load requirements is an important problem. The authors propose a proactive DBS deployment method to enhance the DBS deployment flexibility based on network traffic. The proposed scheme uses potential value and minimum distance to decide the areas that most need to be covered, which are named as proactive coverage areas (PCAs), whereby the DBSs are assigned to cover those PCAs. Meanwhile, when the number of required DBSs is determined, the energy consumption is related to the coverage radius and the altitude of DBSs. Therefore, the proposed method further investigates the on-demand coverage radius and then obtains the altitude of DBSs. Simulations show that the proposed proactive DBS deployment method provides better coverage performance with a significant complexity reduction.

The deployment of a fixed base station (FBS) in the form of macro or micro base station has been the only way to handle the ever-increasing data traffic demands to date. The macro base stations are mounted on ground-based poles, rooftops and other existing fixed structures, at a height that provides a clear view over the surrounding buildings and terrain, while micro cells are usually deployed indoors. The transitioning to new generation of cellular networks such as 5G is expected to increase the radio access capacity many folds providing a more economical deployment to serve data traffic and provide improved data rates to users. However, this strategy still lacks the flexibility of location adjustment according to actualized traffic. Moreover, such a fixed and rigid radio access network is challenged in handling the difficult-to-predict real-time large traffic patterns caused by variations in user densities and specific application usage. In other times, an emergency condition such as a major disaster causes a coverage loss temporarily. Hence, the use of Unmanned Aerial Vehicle (UAV) based cellular networks that can provide a low-cost and instantaneous relief in handling unexpected traffic patterns for short periods of time.

Recently, there has been a growing interest and research in academia on placement of drone base stations. There are interrelated problems to solve to optimize the coverage area and to serve unexpected traffic that is generated by user groups using drones:

The density (or number) of DBSs to be deployed in an area

The 2D coordinates and altitude of each DBS

In determining these parameters, the total number of drones deployed and the total energy consumption of drones must be carefully considered. Each drone would have a minimum and a maximum vertical altitude by design. Moreover, the energy consumption of a drone is a key variable, which is associated to its altitude. As the altitude increases, the covered area is widened, but with that, the energy consumption has gone up as well. Thus, the 2D location (that is generally specified by latitude and longitude) to maximize the serving area of each DBS and the optimal altitude to minimize energy consumption become two key problem variables. The problem of drone location determination is considered as prior art, the solution methods of which can be used within this patent application.

A Drone RAN (DRAN) is comprised of a plurality of DBSs interconnected by cellular connections forming a small network with a connected graph topology to reach all local User Equipment (UEs) on ground and in the neighborhood, wherein a UE is a mobile cell phone, IoT, or any other type of device using cellular radio technology. The graph topology ensures each DBS is reachable by any other DBS in the DRAN via at least one path. Usually, one of the DBSs in the DRAN is connected to a fixed base station with a backhaul cellular radio connection to reach all Internet attached land-based devices. Alternatively, in a hybrid solution, while DBSs communicate with cellular radio, the backhaul connection can be a different wireless technology such as Worldwide Interoperability for Microwave Access Network (WiMAX) or Satellite.

When an unexpected traffic pattern materializes, in addition to solving the spatial re-positioning of a DBS it is required to reconsider and solve the time-dependent positioning and control of all DBSs, accordingly. As traffic patterns change in time, there are possible strategies for DRAN re-configuration. Each strategy is captured as a separate configuration control function below:

Topology Change Function (TCF): Change the 2D (horizontal) position of a drone as well as its altitude because user groups move or intensify in certain areas. While applying this strategy, one has to consider the relative positioning of drones. TCF includes adjustment on antenna tilt angles. Doing so, the DBSs are more optimally positioned on top of dense clusters of user groups that need service. TCF can be applied to a single DBS, or a plurality of DBSs at the same time. Sometimes a DBS is moved closer to ground without changing its 2D coordinates just to save power.

Graph Change Function (GCF): Change the drone-to-drone and drone-to-backhaul radio interconnection topology to adhere to shortest-path packet routing. This function is needed, because when one or more drones are repositioned, their interconnection topology must also be re-optimized accordingly to minimize interference and optimize packet routing path lengths. For example, links between those drones that are re-positioned farther away from each other may no longer be most optimal.

Interference Avoidance Function (IAF): Avoid radio layer interference by splitting the radio sub-bands between actual on-ground user equipment (UEs) and the backhaul UEs (i.e., those UEs used to achieve DBS to DBS connections above ground), and between DBSs. When Drone RAN topology is modified according to TCF and GCF, the radio frequency usage must also be adjusted to avoid radio frequency interference.

UE Load Balancing Function (LBF): Shift the serving DBS of on-ground UE groups from one DBS to another to ensure the user groups are served more optimally. This strategy can use handover or blacklist features to relocate a UE's connection. If two adjacent DBS's serve with the same Access Mobility Management Function (AMF) or neighboring AMFs, UE can be forced to handover for load balancing without any loss in data traffic. If handover is not possible, DBS can add UE to its blacklist and force a disconnection from itself. The second method will cause UE to connect another DBS, if the rejection cause is set correctly. It allows less busy DBSs to get engaged serving user groups in crowded areas when the serving DBS is not topologically most optimally positioned. Load balancing actions also include reserving specific DBSs to serve only higher QoS/slice user traffic.

Each DBS is comprised of four major hardware/software components:

The Drone sub-component that is mainly comprised of an autopilot that can fly the drone to a programmed location. It has drone navigation software that drives the drone using a specified trajectory, and using high-precision sensors, enables the drone to stay pinpoint stationary at a location (unless there is a strong wind/hurricane). All drones have an advanced GPS system, an intelligent autopilot, an advanced stabilization technology, a collision avoidance technology, and top of the line cameras. All of these drone functions are well known in the art.

The Base Station sub-component that is comprised of radio antennas and software components for the data plane (DP) and control plane (CP) functions of a base station. Here, it is assumed that the base station supports advanced radio network standards such as 5G and beyond, and therefore uses control plane and data plane separation according to Software Defined Networking (SDN) and Network Function Virtualization (NFV).

The Core Network sub-component that is comprised of the Virtualized Network Functions (VNFs) of a mini core network of a 5G operator. It consists of those essential data plane and control plane functions such as the User Plane Function (UPF), Session Management Function (SMF), Policy Management Function (PMF), Network Repository Function (NRF), Access Mobility Management Function (AMF) and so on for a stand-alone network within DBS. The Core Network sub-component is optional and may not be present in all DBSs. Some smaller and less expensive DBSs may use the flying core network of other DBSs or the fixed core network of the mobile operator.

DBS Controller sub-component that provides configuration control of all sub-components of a DBS. It can be viewed as the 'client' of the DroneRAN Controller, which acts as the control 'server'. It receives different types of control requests from DroneRAN Controller, executes locally, and responds to DroneRAN Controller. DBS Controller also provides essential localized control actions that pertain to that DBS only (such as changing configuration parameters) without interference from the DroneRAN Controller. This may be most needed when DroneRAN Controller is unavailable or too slow to respond to changes in the network status.

Backhaul UE sub-component a plurality of which provides physical connections to base station components of adjacent DBS's. Backhaul UEs are typically integrated cellular modems, which have similar capabilities with regular UEs. There can be more than one backhaul UE in a DBS to provide multiple simultaneous connections to different adjacent DBS's.

SDN is an important networking paradigm, primarily used in IP networks that allows a centralized controller (also known as SDN Controller or simply Controller) to determine IP packet routes in a network, and to communicate the corresponding packet forwarding rules to the switches (also known as forwarders) using a control network between the Controller and each switch. The switches do not run any routing protocol; they simply forward packets (data plane) according to the instructions from the Controller. SDN concepts are fairly simple, widely known and widely deployed.

The concepts provided by the SDN, i.e., separating the control and data plane functions, as well as Network Function Virtualization (NFV) by virtualizing and distributing these functions are used in 5G standards to distribute the granular control and data plane functions. For example, User Plane Function (UPF) is defined as a data plane function of the core network, while Session Management Function (SMF) and Policy Control Function (PCF) are control plane functions of the core network. Similarly, CU-UP and CU-CP are exemplary data plane and control plane functions of a base station in 5G.

The DroneRAN Controller, a key component of this invention, performs a group of centralized control functions on DRAN topological configuration, and communicates the configuration decisions using control messages to all DBSs just like the other control functions seen in 5G networks. It is comprised of new virtual network functions of TCF, GCF, IAF and LBF, described above. The DBS can also act autonomously from time to time using locally residing TCF, GCF, IAF and LBF (or the local DBS Controller) for an incremental configuration change without waiting for a control command from the DroneRAN Controller. A DBS acts according to DroneRAN Controller commands, which happen when there are DRAN topology changes that span a plurality of DBSs (adding more DBSs to network, changing location of several DBSs, re-partitioning of RF bands, etc.).

RAN Intelligent Controller (MC) is a prior art system in 5G being designed for real-time and non-real time controls of fixed radio access networks for radio resource allocation (see O-RAN Alliance White Paper on O-RAN Use Cases and Deployment Scenarios, February 2020). However, MC handles neither the aspects of dynamically moving base station configurations nor control of associated core network components.

There are two types of radio connections in the Drone RAN: DBS to DBS (D2D) and DBS to centralized DroneRAN Controller (D2C) connections. The D2C connection is simply a radio connection towards a fixed base station, which provides an indirect pathway to the DroneRAN Controller (most likely ground-based). There are many embodiments of the DroneRAN Controller: It may run on the fixed macro base station, at a ground-based DroneRAN control center server, at one of the DBSs, or on one of the Network Management and Operations System servers. At least one DBS in DRAN needs a D2C connection. DBS that has the D2C connection is called the backbone (or gateway) DBS. D2D and D2C connections are data connections that normally carry UE packet data traffic, but they also carry control messages. For an isolated DRAN, i.e., with no D2C connection, the communications service can be provided only amongst those UEs that are attached to the DBSs in DRAN. Meaning, no outreach is provided beyond the local area of the DRAN.

According to the first aspect of this invention, each DBS is a node that is designed to act in a mesh (or relay) node in a DRAN that is comprised of a plurality of DBSs, the DRAN forming an ad-hoc mesh network whose 3D topology is re-optimized from time to time by new configuration control virtual functions (namely TCF, GCF, IAF and LBF) that comprise the DroneRAN Controller. Said 3D topology is modified by controlling: (i) the drone sub-component's 2D coordinates and altitude, and (ii) the base station sub-component's antenna tilt angles and cellular connectivity to neighbor DBSs. Adjacency (via cellular connectivity) between a pair of DBSs is achieved by exploiting a plurality of backhauling UEs within each DBS such that one of the backhauling UEs connects directly to a nearby DBS.

According to a second aspect of this invention, each DBS has a resident core network that can independently and collaboratively performs IP routing of packets between User Equipment (UE) without needing to go to a ground-based cellular network's core network.

According to a third aspect of this invention, each DBS has a resident DBS Controller that can act as the master, or as a slave to DroneRAN Controller to perform configuration control functions (namely TCF, GCF, IAF and LBF). A Drone control channel is implemented between the DBS Controller sub-component and the other sub-components of the DBS to transmit any internal control messages originating from the resident DBS Controller or from the DroneRAN Controller.

According to a fourth aspect of this invention, D2C control channel is implemented for point-to-point communications between the DroneRAN Controller and any DBS in DRAN, said channel carrying configuration control request and response messages controlling the drone as well as other sub-components of said DBS. This channel forms an 'in-band control network', so that each DBS in the DRAN is reachable by the DroneRAN Controller. Said channel carries only control messages and uses TCP/IP protocol at layer 3. Each control message between any DBS and DroneRAN Controller is transmitted via a plurality of concatenated D2C control channels traversing a plurality of transit DBSs along the path. Each transit DBS along the path between the target DBS and the DroneRAN Controller merely relays the control message to the next hop transit DBS, using its control channel, until the message reaches the target DBS. The control messages pertaining to a DBS is received and processed by its DBS Controller.

According to a fifth aspect of this invention, D2D control channel is implemented for point-to-multipoint communications between the neighbor DBSs that are adjacent (attached). It is on the D2D data connection, and uses the TCP/IP protocol at layer 3. Any control message between a pair of DBSs is transmitted on said D2D control channel.

The drone seemingly operates independently from other functions of a DBS as it carries out completely different and independent functions of flying the vehicle. It is well known in prior art that the drone handles the autopilot and hence the DBS positioning, while the base station serves cellular end points and core network enables user authentication, location determination and data packet routing. However, according to the present invention, there is an integrated control operations achieved via the centralized DroneRAN Controller and the local DBS Controller. This integration is deemed optimal since the actual topology of the DRAN is not only controlled by the 3D geographic positioning of drones, but also by the graph connectivity between DBSs achieved via activation and de-activation of cellular DBS to DBS data connections, antenna tilt angles and packet routing according to this selected graph topology. Furthermore, the drone sub-component can report status to its DBS controller or may receive commands for sensor or camera operations, or for coordinating or load balancing change requests.

The control network in a typical SDN network is an 'out of band' and forms a completely separate set of connections from the data connections, but in Drone RAN and according to an aspect of the present invention, the control channels are in-band, i.e., share the data connections. These control channels are virtually separated from the data connections via tunneling such as a GPRS Tunneling Protocol (GTP), Generic Routing Encapsulation (GRE) allocated to carry only control messages.

The Drone RAN forms a routed local IP network. Each DBS communicates the IP addresses of its directly attached UEs to the core networks of adjacent (directly connected) DBSs using the D2D control channel. Each DBS eventually learns about all the IP addresses of all UEs within the range of DRAN, and which UE is served by which DBS. This knowledge is used to route UEs' IP packets within the range of DRAN. If an IP address is unknown to the core network of a DBS, the packets to this address are forwarded towards the fixed base station (or, WiMax base station or satellite) using the D2C control channel, which in turn forwards the packets to the DroneRAN Controller that acts as a default router. The core network within the DroneRAN is necessary for routing of data packets within its coverage area. DBS interconnects to neighboring DBSs with a cellular interface for mainly signaling and packet forwarding during handover, for control message forwarding and data packet forwarding between UEs. The base station and core network, together, is responsible for interference mitigation and coordination in case same frequency bands are used between neighboring base stations. When the UE has a packet to send to another UE, it first sends a request to the core network. The core network is responsible for session establishment and routing of packets.

The DBS mesh has a chosen 'backbone DBS' that attaches to a micro or macro base station. This connection is known as the 'backhaul'. The fixed base station is named as the 'anchor base station' in this document. The choice of backbone DBS may change from time to time amongst all drones, or at any time, there may be more than one DBS acting as a backbone drone, but the backbone DBS is a crucial element that provides two vital functions for the DBS mesh:

(a) Inter-connects the DBS-mesh (Drone RAN) to the fixed (RAN) of the operator.

(b) The backhaul connection (e.g., an IP-based connection) between the backbone DBS and the anchor base station is used by the DroneRAN Controller to send control messages to all DBSs in the mesh and receive responses. The DroneRAN Controller communicates with the anchor base station first, which in turn communicates with the backbone DBS. In turn, backbone DBS sends control messages to all of its D2C control channels, and receiving DBSs send to theirs, and so forth. The control messages vary from changing mesh topology, to reassigning the radio frequency bands or to configure software features according to user group profiles, etc. Furthermore, the backhaul connection allows collection of monitoring data from the entire DBS-mesh. It allows a DBS to report events such as failure, depletion of power, or major performance degradation.

Configuration management requires near real-time control of both the drone and base station (BS) sub-components of each DBS using the D2C control channels. The following are key configuration actions of the DroneRAN Control functions:

TCF Actions: Below exemplary actions are for mainly topological control of nodes of the DRAN.
- Adding or deleting a DBS in DRAN
- Activation or deactivation of the base station on DBS
- Activation or deactivation of the core network on DBS
- Activation or deactivation of the DBS controller on DBS
- A topological change of drone's geographic 2D position
- A topological change of drone's altitude
- A topological change of changing antenna tilt angle
- Assigning or un-assigning a DBS as Backbone DBS
- Assigning an anchor base station to a DBS
- Assigning and un-assigning the DroneRAN Controller to each DBS
- Assigning IP addresses to DBS and backhaul UEs GCF Actions: These exemplary actions are mainly topological control actions on data connections and control channels of the DRAN.
- Activation or deactivation of D2D data connection
- Activation or deactivation of D2C data connection
- Activation or deactivation of the D2C control channel
- Activation or deactivation of the D2D control channel
- Assigning IP addresses to end points of control channel tunnels IAF Actions: These exemplary actions are mainly radio resource management actions pertaining to use of RF bands.
- Assignment of RF bands to DBS backhaul connection
- Assignment to RF bands to inter-DBS (D2D and D2C) connections
- Assignment of RF bands to DBS to serve UEs
- Assignment of RF bands to user groups within DBS LBF Actions: These exemplary actions are mainly topological control actions pertaining to UE servicing configuration in DRAN.
- Assigning or un-assigning of users or user groups to DBSs
- Assigning or un-assigning of a network slice to a DBS
- Reserving or un-reserving a DBS to a specific network slice
- Triggering network initiated handover to adjacent DBS
- Adding UEs to blacklists for admission control
- Triggering network initiated UE rejection with certain causes
- Adjustment of cell individual offset of DBS Furthermore, each individual configuration control function may also report events and KPIs pertaining to its operations including:
- Event reporting by the base station sub-component (e.g., un-served UE count, control tunnel failure, inter-DBS connection failure, antenna failure)
- Event reporting by the drone sub-component (e.g., power failure, component failure, remaining power, failure to execute a command)
- Reporting of active user counts
- Reporting user Key Performance Indicators (KPIs) related to radio network such as interference
- Reporting drone power status, sensor recordings, camera recordings Embodiments of the present invention are an improvement over prior art systems and methods.

SUMMARY OF THE INVENTION

In one embodiment, the present invention provides a system as implemented in a drone radio access network (DRAN) comprising: a drone radio access network (DRAN) controller; a plurality of drone base stations (DBSs) forming a wireless mesh network, a first DBS in the plurality of DBSs attached to a land-based base station, and each DBS in the plurality of DBSs providing communications between wireless user equipment (UE), each DBS comprising a local DBS controller; the DRAN controller: determining one or more control actions with regards to the first DBS in the plurality of DBSs, the first DBS having a first local DBS controller; maintaining a wireless control channel providing a connection (e.g., an IP-based connection) between the DRAN controller and the first local DBS controller via the land-based base station; communicating the one or more control actions to the first local DBS controller over the wireless control channel; and wherein the first local DBS controller is configured to act as a client of the DRAN controller and the first DBS controller tasked to execute the one or more control actions received by the DRAN controller and, based on the one or more control actions, changing a configuration of the first DBS.

In another embodiment, the present invention provides a method as implemented in a drone radio access network (DRAN) controller that is part of a drone radio access network (DRAN), the DRAN controller communicatively coupled with a plurality of drone base stations (DBSs) forming a wireless mesh network, a first DBS in the plurality of DBSs attached to a land-based base station, and each DBS in the plurality of DBSs providing communications between wireless user equipment (UE), each DBS comprising a local DBS controller, the method comprising: determining one or more control actions with regards to the first DBS in the plurality of DBSs, the first DBS having a first local DBS controller; maintaining a wireless control channel providing a connection (an IP-based connection) between the DRAN controller and the first local DBS controller via the land-based base station; communicating the one or more control actions to the first local DBS controller over the wireless control channel; wherein the first local DBS controller is configured to act as a client of the DRAN controller and the first DBS controller tasked to execute the one or more control actions received by the DRAN controller and, based on the one or more control actions, changing a configuration of the first DBS.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, where a particular feature, structure, or characteristic is described in connection with an embodiment, it is submitted that it is within the knowledge of one skilled in the art to affect such feature, structure, or characteristic in connection with other embodiments whether or not explicitly described.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a router, switch, hardware platform, controller, base station etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a switch, router, base station, controller, or virtual machine is a piece of networking component, including hardware and software that communicatively interconnects with other equipment of the network (e.g., other network devices, and end systems). Base stations provide radio connectivity to user equipment such as cell phones. The base station houses antennas that receive and transmit signals of the cellular network to customer phones and other cellular devices. The base station is connected to a mobile operator's switch/router that connects the cellular calls to the public switched telephone network or the cellular IP data traffic to the Internet.

Any physical device in the network is generally identified by its type, ID/name, Medium Access Control (MAC) address, and Internet Protocol (IP) address. A virtual function runs on a physical platform that can be the switch or a server attached to the switch. There may be several instances of the same virtual function or different types of virtual functions on the same physical platform. The SDN controller can run on a single server or may be distributed on several servers. At any point in time, one controller may be the master while others are slaves. Alternatively, the plurality of controllers may be in a peer mode.

Note that while the illustrated examples in the specification discuss mainly NFV (as ETSI defines) relying on SDN (as Internet Engineering Task Force [IETF] and Open Networking Forum [ONF] define), embodiments of the invention may also be applicable in other kinds of distributed virtualized network function architectures and programmable network architectures, not necessarily tied to NFV and SDN.

Figure 1:
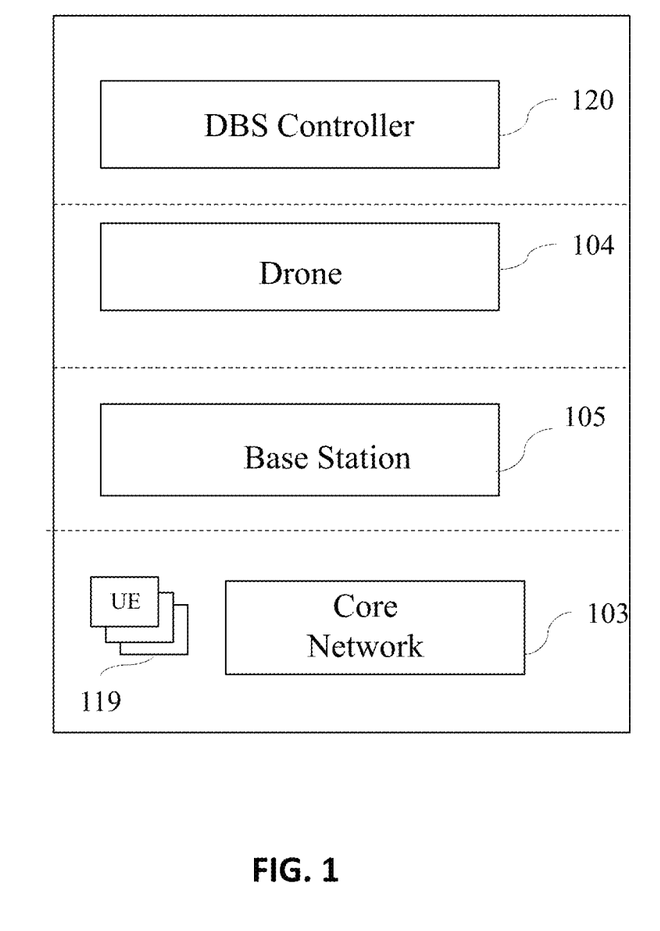
FIG. 1 depicts a diagram of components of Drone Base Station (DBS) according to invention.

FIG. 1 illustrates a block diagram of Drone Base Station (DBS) components according to invention. DBS Controller 120 is an onboard controller that controls the DBS configuration, communicates with other sub-components of DBS as well as DroneRAN Controller. Drone 104 is simply an unmanned small aircraft component of the DBS that can be controlled locally and from a remote drone control center. Base Station 105 is a typical low-power small base station with an antenna array for transmitting and receiving radio signals from cellular User Equipment (UE). It covers an area called drone-cell, which has a limited diameter coverage area and number of UEs supported. At higher altitudes, free-space propagation is an important effect that leads to a completely different radio environment. Macro base stations are often placed in elevated positions, such as on cell towers or on top of buildings to eliminate obstruction of Line of Sight (LoS) from other tall objects such as trees and buildings. If the base station moves to a higher altitude, as in the case of a DBS, the likelihood of objects obstructing the LoS path becomes much smaller. Since the signal propagation in the sky is close to free-space propagation, the signal strength becomes stronger due to the highly reduced path loss. Although the strong signal strength from the serving base station is highly desirable, the DBS may have LoS paths crossing many other DBSs' in Drone RAN. If the cells share the same radio resources, this phenomenon increases the radio frequency interference for the DBS. Thus, handling the interference becomes a key issue in DRAN design. Partitioning the radio frequency bands between adjacent DBSs is one way to reduce the interference. Other important configuration parameters to reduce interference and hence improve the signal strength to UEs are inter-DBS distance, antenna height, and antenna down-tilt angles. Dedicated radio resources can be easily reserved to serve specific groups of UEs completely free of any interference from other terrestrial UEs.

DBS may optionally include Core Network 103 that has typical data plane and control plane virtualized network functions (VNFs) that allow the DBS to perform packet routing without needing to send packets to the operator's terrestrial core network. The DBS may not necessarily have an onboard core network; instead, it may use other DBS's core network. If DBS is employed as part of a DRAN, it connects to other DBSs via radio links through backhaul UE 119 subcomponent. It can be visualized as a flying UE used simply to attach to base station component of an adjacent DBS to establish a direct radio link in the sky.

Figure 2:
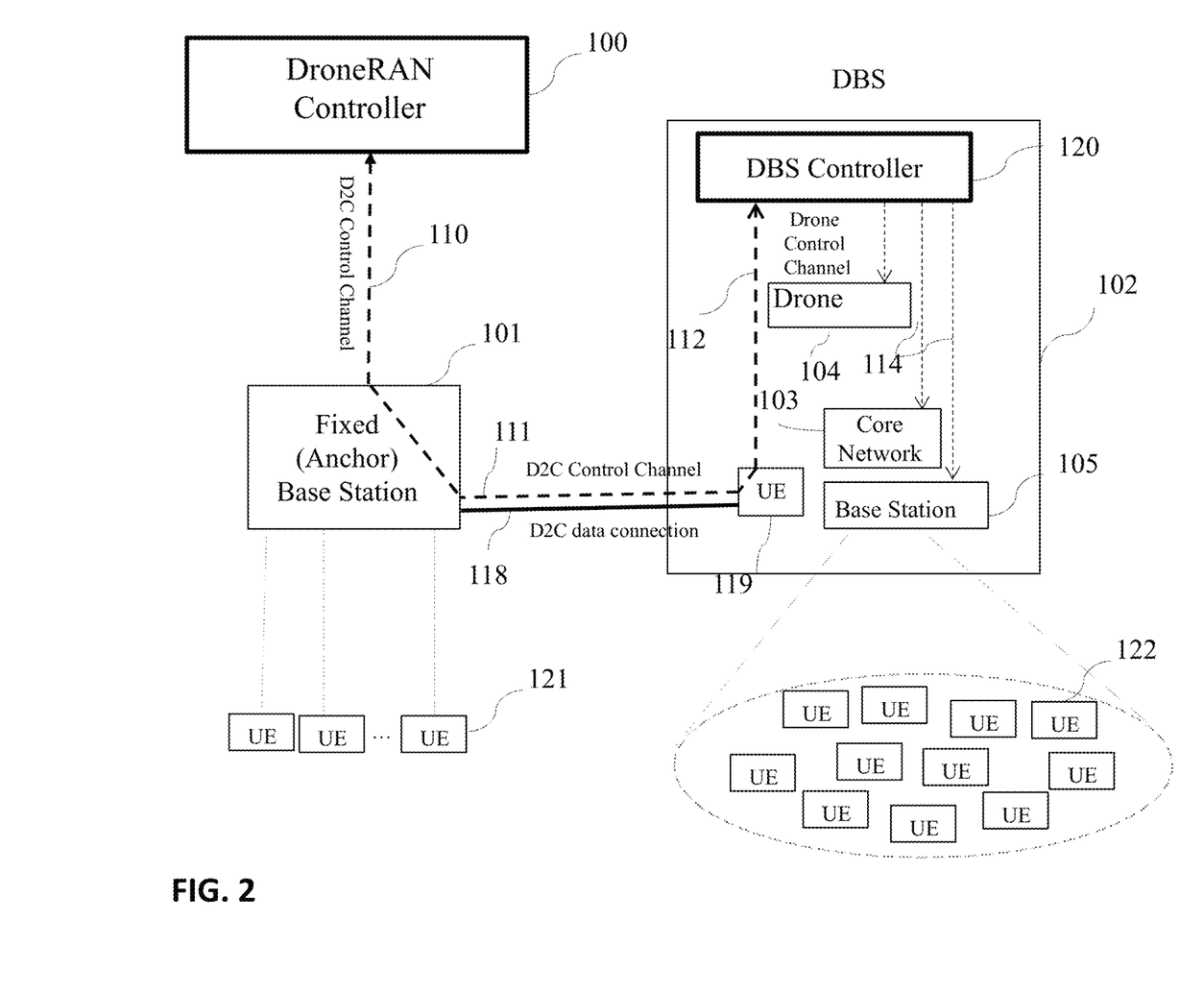
FIG. 2 depicts the network diagram of Drone RAN with a single DBS according to invention.

FIG. 2 illustrates a DRAN comprised of DBS 102 (positioned in above ground) attached to fixed (ground-based) base station (cellular or WiMax) or satellite 101 with backhaul radio connection 118. DroneRAN Controller 100 controls DBS 102. DBS 102 has onboard DBS Controller 120, Drone 104, Core Network 103, Base Station 105 and UE 119 as illustrated in FIG. 1. Base Station 105 serves a group of terrestrial UEs shown as UE group 122 (in the drone-cell). Similarly, Base Station 101 serves a group of terrestrial UEs shown as UE group 121 (in the macro-cell).

Several control channels are also illustrated. Drone Control Channel 114 carries control messages for onboard control of Drone 104, Core Network 103, Base Station 105 and UE 119. D2C control channel is between DroneRAN Controller 100 and DBS Controller 120 and comprises concatenated tunnels of 110 and 111, as well as the internal control channel 112. UE 119 attaches to base station 101 to form a backhaul radio data connection 118 between DBS 102 and BS 101. Control channel is a tunneled connection on data connection 118 carrying only control messages between DroneRAN and DBS controllers.

Figure 3:
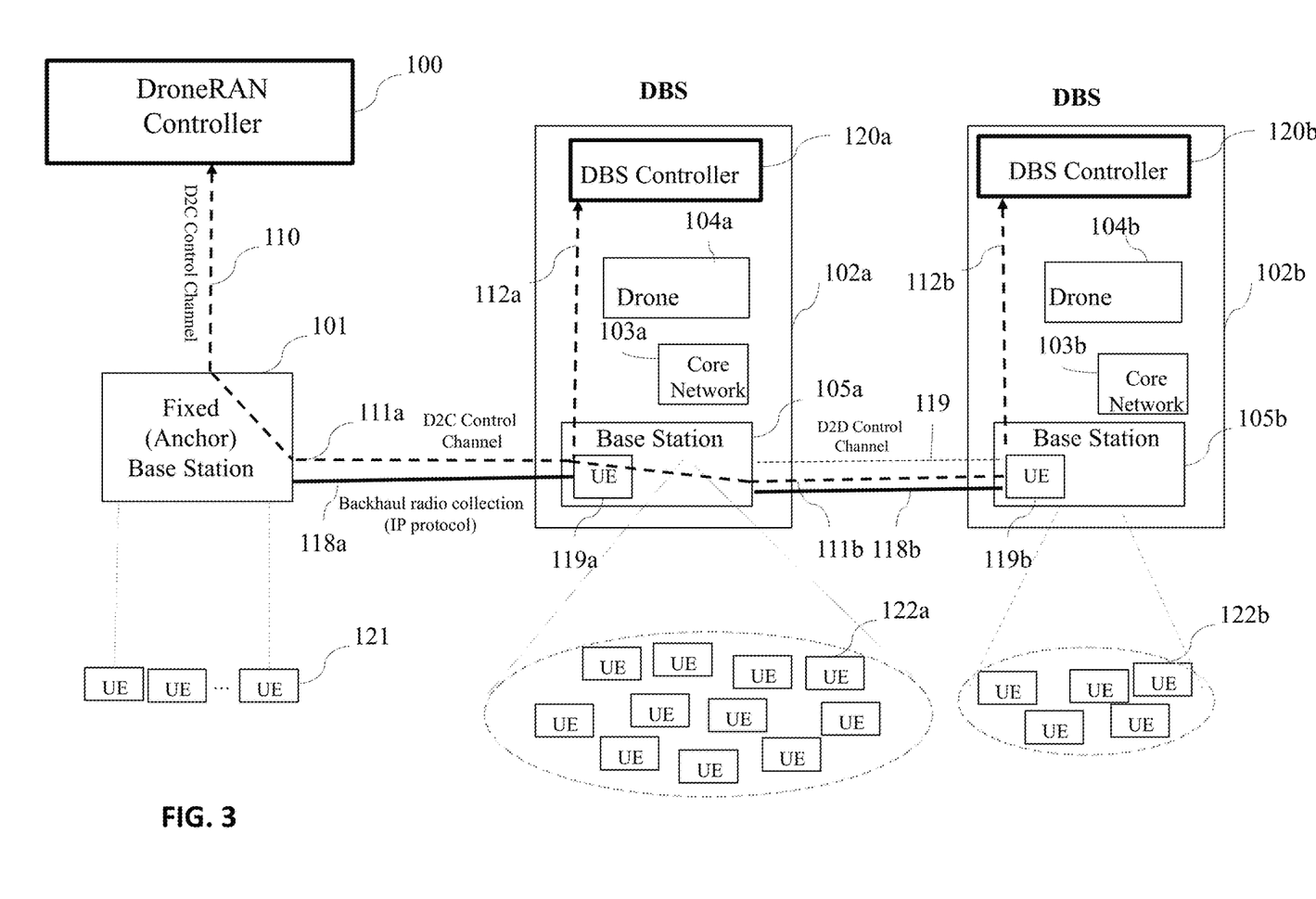
FIG. 3 depicts a network diagram of Drone RAN with two DBSs according to invention.

FIG. 3 illustrates a DRAN comprised of DBS 102a and DBS 102b (both positioned above ground) and attached to fixed (ground-based) base station 101 with backhaul radio connection 118a. DroneRAN Controller 100 controls both DBS 102a as well as 102b. DBS 102a has onboard DBS Controller 120a, Drone 104a, Core Network 103a, Base Station 105a and UE 119a, wherein UE 119a is attached to base station 101 to form the backhaul radio connection. DBS 102b has onboard DBS Controller 120b, Drone 104b, Core Network 103b, Base Station 105b and UE 119b, wherein UE 119b is attached to base station 105a to form D2D data connection. Base Station 105a serves a group of terrestrial UEs shown as UE group 122a (in the drone-cell). Similarly, Base Station 105b serves a group of terrestrial UEs shown as UE group 122b (in the drone-cell). Base Station 101 serves a group of terrestrial UEs shown as UE group 121 (in the macro-cell).

Several control channels are illustrated. The control channel between DroneRAN Controller and DBS 120a is comprised of concatenated connections 110, 111a and 112a. The control channel between DroneRAN Controller and DBS 120b is comprised of concatenated connections 110, 111a, 111b and 112b. Furthermore, between DBS 120a and 120b, there is D2D control channel 119. Note that both D2D control channel 119 and D2C control channel 111b share the same data connection 118b formed between UE 119b and Base Station 105a. These control channels are, for example, GTP or GRE tunnels, both known in prior art. Connection 118a is the backhaul connection since it attaches the DroneRAN comprised of two DBSs to the fixed base station 101.

Figure 4:
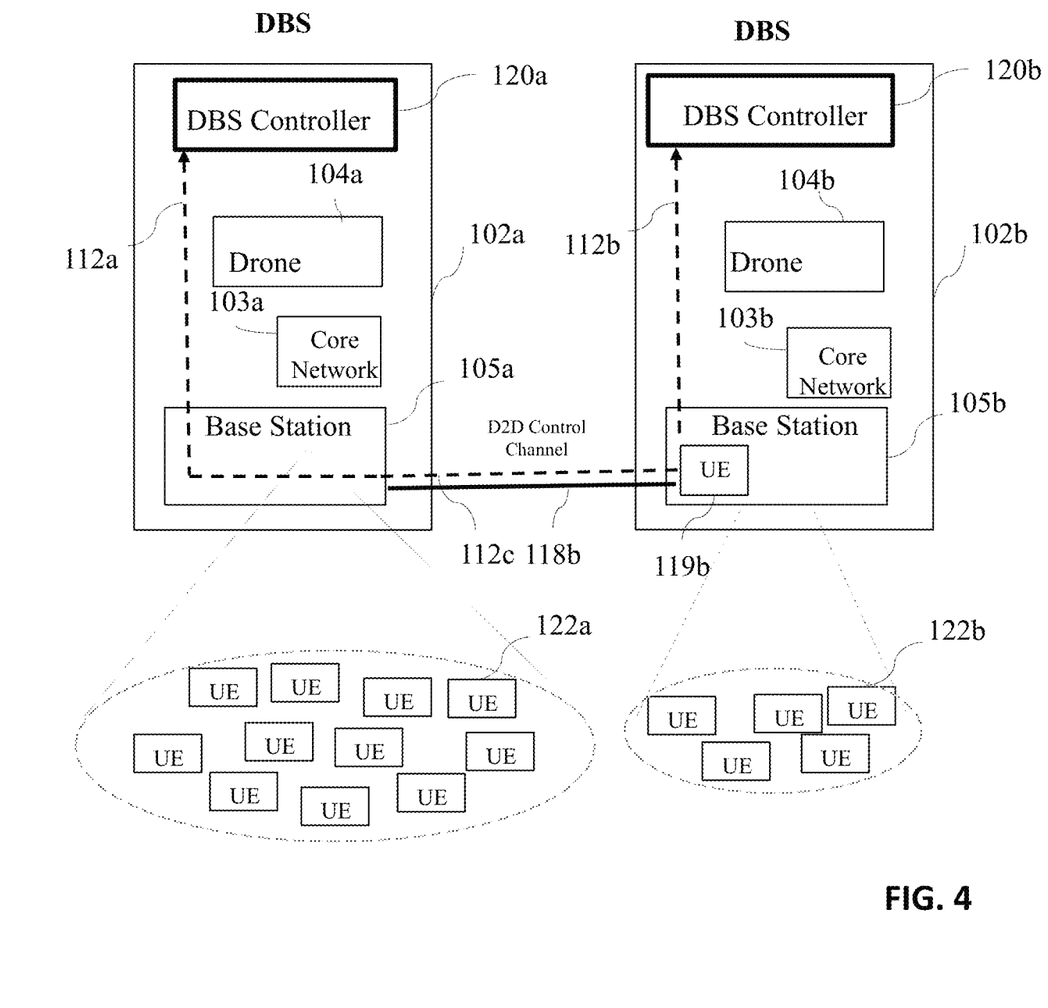
FIG. 4 depicts a network diagram of Drone RAN without a DroneRAN Controller.

FIG. 4 illustrates a similar topology to FIG. 3 without a fixed base station connection. In practice, this kind of topology occurs when the D2C link is not feasible to establish due to a physical reason, or for any special use-cases requiring only peer-to-peer communications wherein outside communications are not required or prohibited. When there is no fixed base station connection, the UEs of 122a and 122b cannot access to internet, but they can still communicate with each other through on-board core networks 103a and 103b. The routing between two networks is simply operated by control interactions between 103a and 103b. The communication between the DBSs is achieved through the D2D control channel 112a, 112b and 112c traversing the D2D data connection established through backhaul EU 119. If the fixed base station disconnects for a short period, drones may continue to stay either in their previous positions and act according to the last control actions they received from the DroneRAN Controller. If the disconnection to fixed base station is for a longer period, the DBS controllers are capable of flight functions such as obstacle avoidance, minor local topology updates, and for return to base when their power is low.

Figure 5:
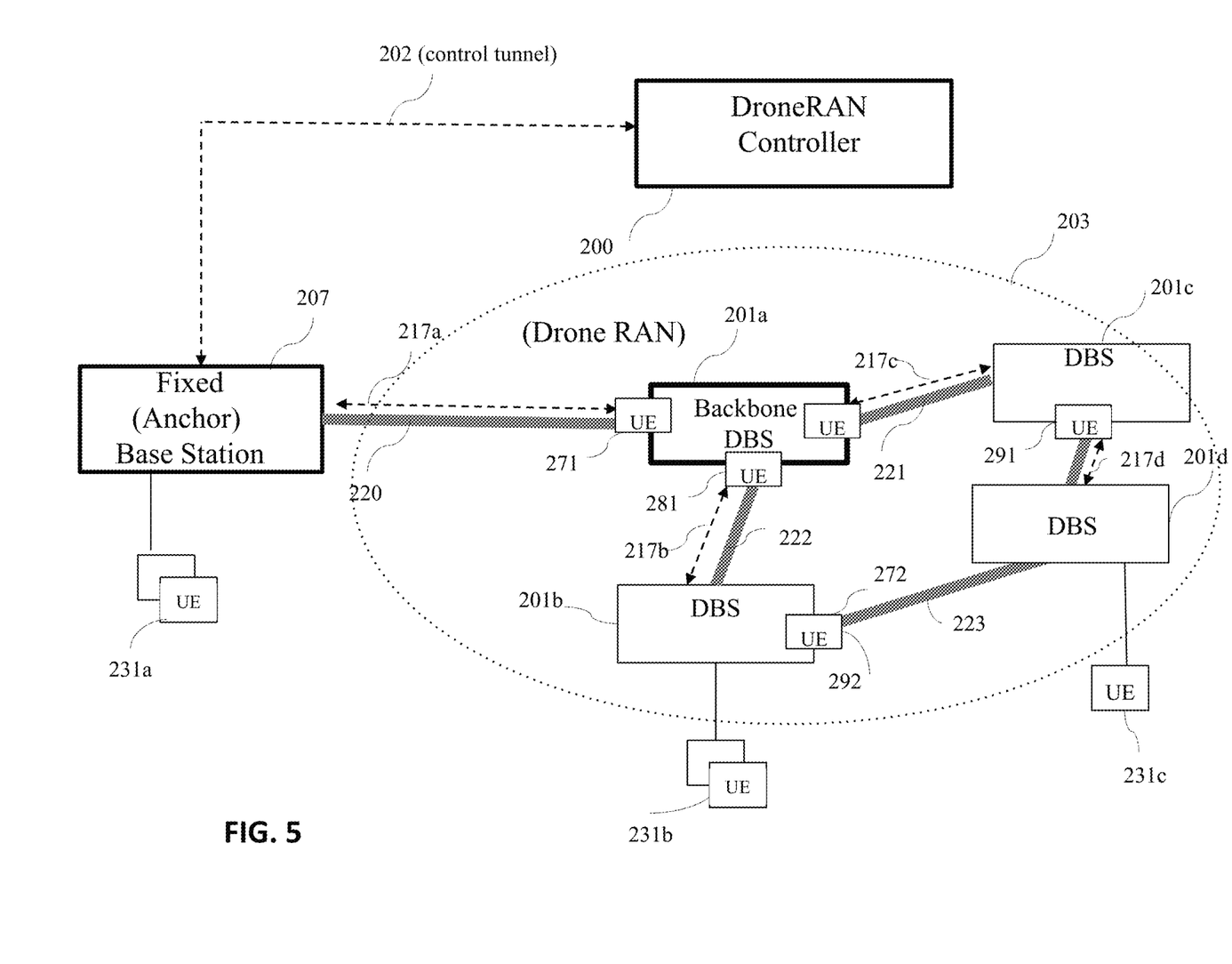
FIG. 5 illustrates an exemplary method of the DroneRAN Controller according to invention.

FIG. 5 illustrates a DRAN network diagram showing a plurality of DBSs, 201a, 201b, 201c and 201d (all positioned above ground), and a fixed (ground-based) base station 207 with backhaul radio connection 220. DroneRAN Controller 200 controls all DBSs in this DRAN. Each of data connections 220, 221, 222 and 223 is established through onboard UE's connection to an adjacent node's base station. For example, data connection 220 is established by UE 271 connecting to fixed base station 207, while data connection 222 is established by UE 281 connecting to base station of DBS 201b, and so on. The control channels are illustrated on the figure as 202, 217a, 217b, 217c and 217d, forming a tree graph. Note that each DBS is reachable by the DroneRAN controller using this tree. The DroneRAN controller may change locations of data connections 220, 221, 222 and 223 from time to time and the corresponding tree topology of control channels to mitigate interference or to optimize data packet routing path. Meaning, the connection topology of the control and data networks DRAN is always dynamic, and optimized according to the performance and load of the network.

Figure 6:
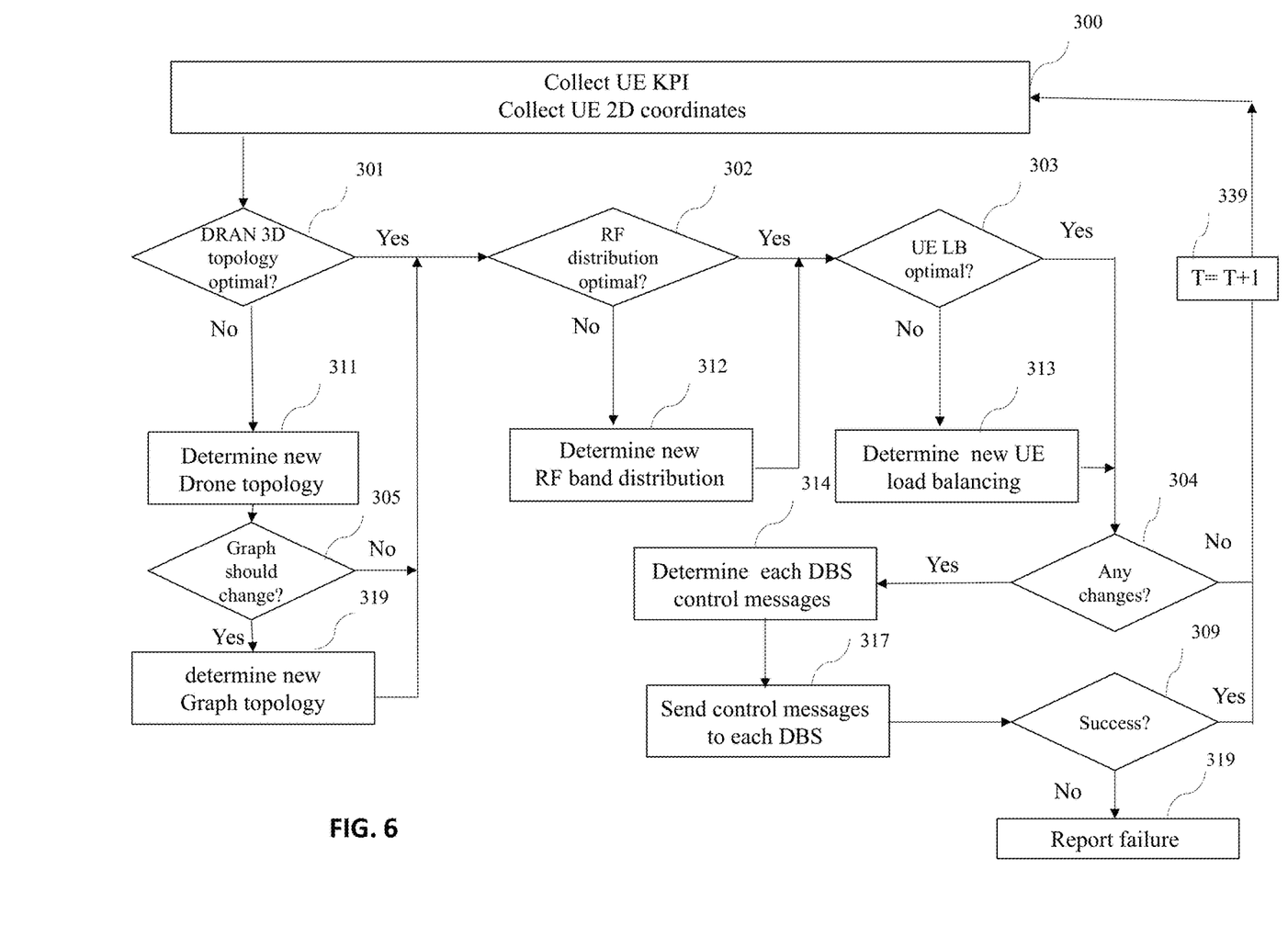
FIG. 6 depicts a network diagram of DRAN with DroneRAN Controller according to invention.

FIG. 6 illustrates a high-level method of the system of the present invention. Each DBS controller in DRAN obtains UE Key Performance Indicators (KPIs) such as the number of active UEs, UE signal strength, connection and handover rates, each terrestrial UE's 2D coordinates, etc., and feeds this information that describes the load and performance of DRAN to DroneRAN controller in step 300. First, DroneRAN Controller makes a determination if the DRAN topology and graph are optimal in step 301. If so, it checks to determine if the RF distribution is optimal in step 302. If so, it checks to determine if UE Load Balancing is optimal in step 303. If so, time is incremented in step 339, and the method returns to step 300 to obtain new network measurements.

If step 301 requires an update on topology and/or graph, the new DRAN 3D topology is determined in step 311, and the graph topology (connections) is determined in step 319. If step 302 requires an update, the new RF distribution is determined in step 312. If step 303 requires an update, the new UE load balancing is determined in step 313. If there are any changes according to any combination of steps described above, in step 304, the control messages pertaining to changes to each DBS are determined in step 314, and sent to each respective DBS in step 317. Step 309 checks to determine if all DBSs successfully received the control messages. If so, the method goes back to step 339. Otherwise, a failure is reported to DRAN controller.

Figure 7:
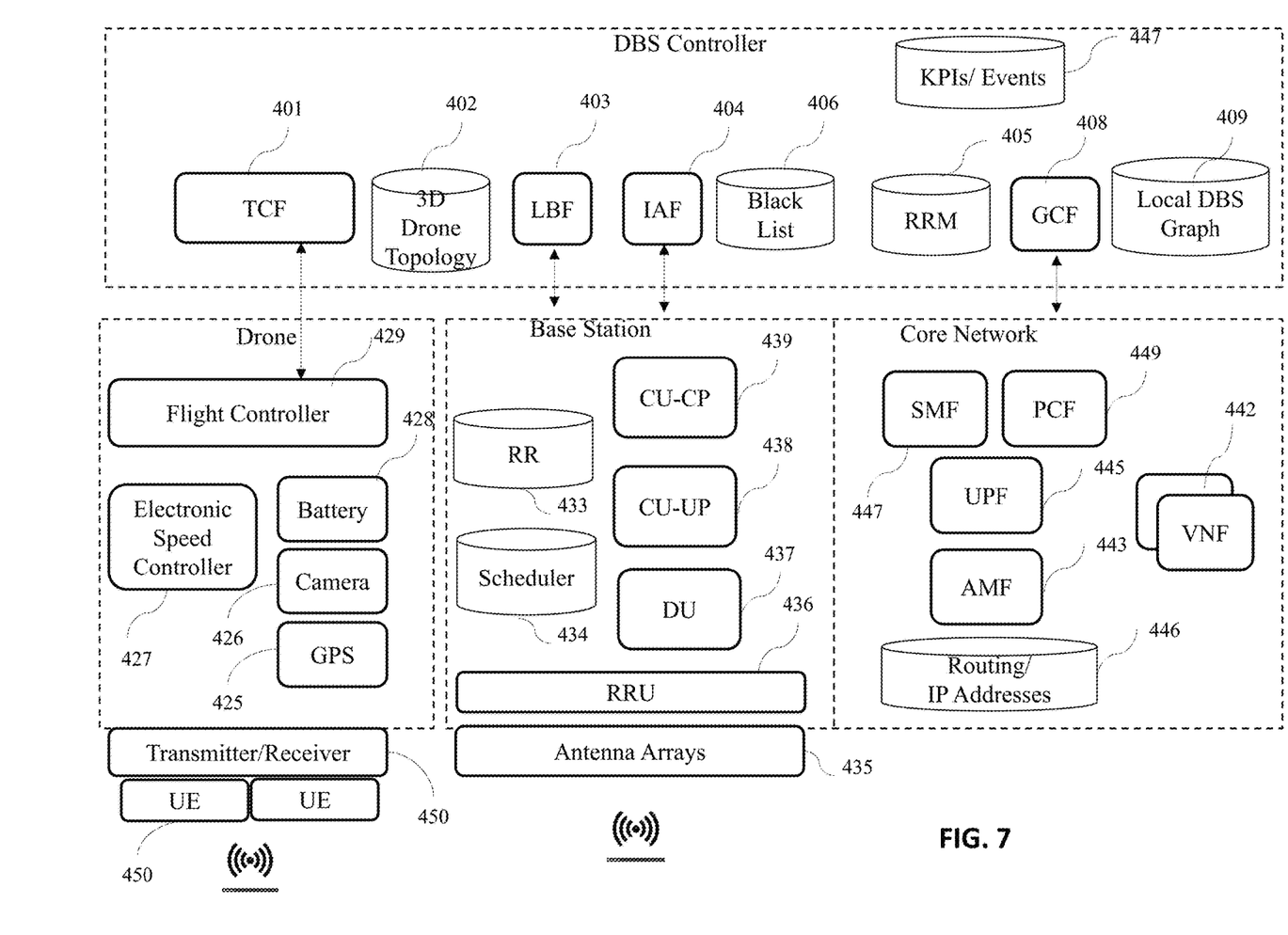
FIG. 7 depicts the block diagram of DBS according to the present invention.

A simplified diagram of a DBS is illustrated in FIG. 7 showing each sub-component within a dashed-line block in FIG. 7. Drone sub-component has typical UAV componentry including Flight Controller 429 that is the brain of the aircraft. It is basically a circuit board with sensors, which detects orientation changes of the drone, receives control commands, and controls the motors in order to keep the drone in the air. The drone has Electronic Speed Controller (ESC) 427 that regulates the drone speed by controlling an electric DC motor, stops the drone at a specified location and stabilizes the drone at a determined coordinate. Additionally, drone has power 428, camera 426, Global Position System (GPS) 425, and other sensors. Drone transmits and receives signals to DroneRAN Controller that has an integrated Drone Control Center through UE 450. This configuration achieves a completely integrated control of both drone and radio network components of DBS.

The base station subcomponent is comprised of Antenna Arrays 435 as an integral component of Remote Radio Unit (RRU) 426 wherein the tilt of antennas can be controlled. It also has Distributed Unit (DU), Central Unit (CU) User Plane (UP) 438 as well as CU Control Plane (CP) 439 using to the terminology of 5G standards. These components may all be implemented as an integrated function in one embodiment. However, in another embodiment, only one of the DBSs in the DRAN may have a CU-UP and CU-CP (brain of the base station), while all other DBSs may only have integrated DU and RRU controlled by the CU-UP and CU-CP. Many different configurations as such become feasible with componentization of the base station, and assumed covered by this invention.

The core network subcomponent can be visualized as a mini flying core network of a mobile operator comprised of almost all necessary VNFs to run the data and control planes. IP addresses assigned to UEs and routing database 446 sits in the core network. Each core network shares the IP addresses of its directly attached UEs with the core networks of the adjacent nodes to enable formation of a routing table.

Figure 8:
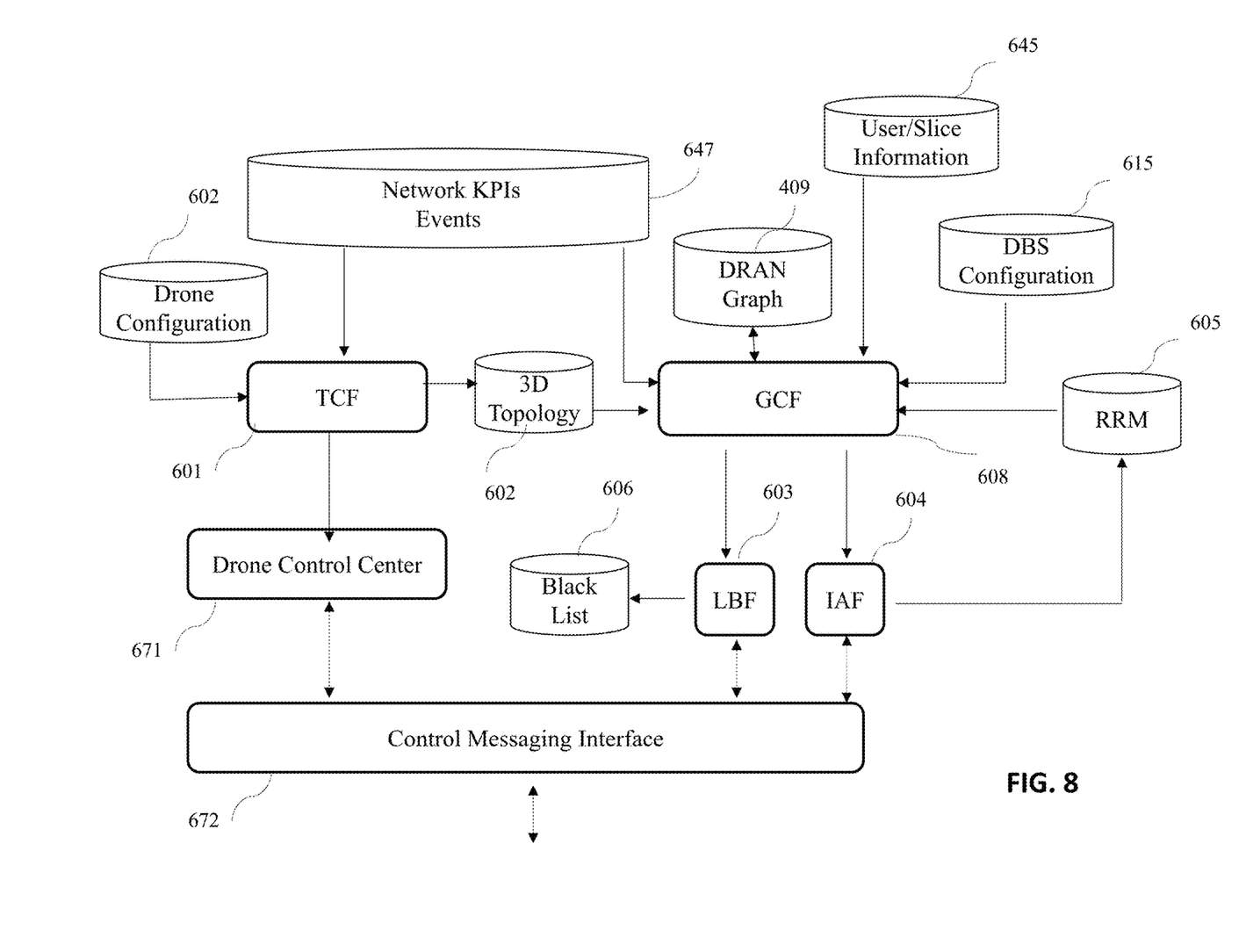
FIG. 8 depicts the block diagram of internal components of DBS to the present invention.

DBS Controller subcomponent is the brain of the DBS (a) having all local control functions, and (b) capability receiving control actions from the centralized DroneRAN Controller and executing these control actions. All events and performance data related to DBS's drone-cell is kept and updated in database 447. TCF 401 controls the 3D location of the drone and communicates with Flight Controller 429. The 3D drone topology is stored in database 402. LBF 403 and IAF 404 control the base station's CU-CP component by sending instructions on radio resource partitioning, scheduler tables and antenna tilt angles. It also sends Black List 406 to change configuration of inter-DBS connection or to force UE groups towards other DBSs. Local DBS Graph 409 contains the information on all data connections and control channels (including IP addresses of tunnel end points) of the DBS. GCF 408 controls the data connections and control channels of the DBS. FIG. 8 illustrates the DroneRAN Controller that has all the functions of DBS Controller shown in FIG. 7, but for every DBS in the DRAN. DroneRAN Controller has an integrated Drone Control Center 671 that controls the drones. The control actions are translated into control messages in Control Messaging Interface 672 and sent towards each DBS. This interface receives other configuration control actions from LBF and IAF, and sends them to each DBS.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The computing system can include clients and servers. A client and server are generally remote from each other and typically interact through a communication network. The relationship of client and server arises by virtue of computer programs running on the respective computers and having a client-server relationship to each other. In some aspects to of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed.

Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system and method for implementing a DroneRAN controller. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A system comprising:
   a drone radio access network (DRAN) controller attached to a land-based base station;
   a first flying drone base station (DBS) attached to the land-based base station, the first flying DBS comprising a first local DBS controller and a first onboard core network;
   a second flying drone base station (DBS) not attached to the land-based base station, the second flying DBS comprising a second local DBS controller and a second onboard core network, the first core network and the second core network enabling a drone-to-drone (D2D) control channel and a D2D data channel between the first flying DBS and the second flying DBS, the first flying DBS and second flying DBS forming a wireless mesh network and communicating with each other through the first and second onboard core networks;
   the DRAN controller:
     determining one or more control actions with regards to the first flying DBS;
     maintaining a wireless control channel providing a connection between the DRAN controller and the first local DBS controller via the land-based base station;
     communicating the one or more control actions to the first local DBS controller over the wireless control channel; and
     wherein the first local DBS controller is configured to act as a client of the DRAN controller and the first local DBS controller tasked to execute the one or more control actions received from the DRAN controller and, based on the one or more control actions, changing a configuration of the first flying DBS.

2. The system of claim 1, wherein the first flying DBS further comprises a drone, and wherein a control action within the one or more control actions relates to a three-dimensional positioning of the drone of the first flying DBS.

3. The system of claim 1, wherein a graph connection topology is maintained in the first local DBS controller, wherein connectivity between the first and second flying DBSs is achieved via activation and deactivation of cellular DBS to DBS data connections according to the graph connection topology.

4. The system of claim 1, wherein a control action within the one or more control actions relates to an assignment of frequency sub-band allocation to UE clusters or DBSs.

5. The system of claim 1, wherein a control action within the one or more control actions relates to an identification of a group of UEs in one or more black lists.

6. The system of claim 1, wherein the first flying DBS further comprises a first drone and a first base station component, the first local DBS controller controlling both the first drone and the first base station subcomponent.

7. The system of claim 1, wherein the DRAN controller communicates one or more control commands with the first local DBS controller and the second local DBS controller.

8. The system of claim 7, wherein the first flying DBS further comprises a drone, and wherein the first local DBS controller is configured to collect and send one or more of the following: (a) one or more event reports on any one of, or a combination of, the following: a power failure in the drone, a depletion of power in the drone, a performance degradation of the drone, (b) one or more UE Key Performance Indicators (KPIs), and (c) information on drone subcomponent's exact geographic coordinates and power depletion status.

9. The system of claim 7, wherein each of the first and second core networks comprises data plane and control plane virtualized network functions (VNFs).

10. The system of claim 1, wherein the DRAN controller is land-based and reachable via the land-based base station through the public Internet.

11. A method comprising:
  determining, at a drone radio access network (DRAN) controller attached to a land-based base station, one or more control actions associated with a first flying drone base station (DBS) also attached to the land-based base station, the first flying DBS comprising a first local DBS controller and a first onboard core network, the first flying DBS and a second flying DBS forming a wireless mesh, the second flying DBS comprising a second local DBS controller and a second onboard core network, the first and second flying DBSs communicating with each other through the first and second onboard core networks, the first core network and the second core network enabling a drone-to-drone (D2D) control channel and a D2D data channel between the first flying DBS and the second flying DBS;
  maintaining a wireless control channel providing a connection between the DRAN controller and the first local DBS controller via the land-based base station;
  communicating the one or more control actions to the first local DBS controller over the wireless control channel;
  wherein the first local DBS controller is configured to act as a client of the DRAN controller and the first local DBS controller tasked to execute the one or more control actions received from the DRAN controller and, based on the one or more control actions, changing a configuration of the first flying DBS.

12. The method of claim 11, wherein the first flying DBS further comprises a drone, and wherein a control action within the one or more control actions relates to a three-dimensional positioning of the drone of the first flying DBS.

13. The method of claim 11, wherein a graph connection topology is maintained in the first local DBS controller, wherein connectivity between the first and second flying DBSs is achieved via activation and deactivation of cellular DBS to DBS data connections according to the graph connection topology.

14. The method of claim 11, wherein a control action within the one or more control actions relates to an assignment of frequency sub-band allocation to UE clusters or DBSs.

15. The method of claim 11, wherein a control action within the one or more control actions relates to an identification of a group of UEs in one or more black lists.

16. The method of claim 11, wherein the first flying DBS further comprises a first drone and a first base station component, the first local DBS controller controlling both the first drone and the first base station subcomponent.

17. The method of claim 11, wherein the DRAN controller communicates one or more control commands with the first local DBS controller and the second local DB S controller.

18. The method of claim 17, wherein the first flying DBS further comprises a drone, and wherein the first local DBS controller is configured to collect and send one or more of the following: (a) one or more event reports on any one of, or a combination of, the following: a power failure in the drone, a depletion of power in the drone, a performance degradation of the drone, (b) one or more UE Key Performance Indicators (KPIs), and (c) information on drone subcomponent's exact geographic coordinates and power depletion status.

19. The method of claim 17, wherein each of the first and second core networks comprises data plane and control plane virtualized network functions (VNFs).

20. The method of claim 11, wherein the DRAN controller is land-based and reachable via the land-based base station through the public Internet.

* * * * *

UNITED STATES PATENT AND TRADEMARK OFFICE
CERTIFICATE OF CORRECTION

| | |
|---|---|
| PATENT NO. | : 11,943,040 B2 |
| APPLICATION NO. | : 17/337179 |
| DATED | : March 26, 2024 |
| INVENTOR(S) | : Koksal Boyali et al. |

Page 1 of 1

It is certified that error appears in the above-identified patent and that said Letters Patent is hereby corrected as shown below:

In the Claims

Claim 11:
Column 19, Line 43, delete "DB Ss" and insert therefore --DBSs--.

Claim 17:
Column 20, Line 32, delete "DB S" and insert therefore --DBS--.

Signed and Sealed this
Eighth Day of April, 2025

Coke Morgan Stewart
*Acting Director of the United States Patent and Trademark Office*